US 6,542,085 B1

United States Patent
Yang

(10) Patent No.: US 6,542,085 B1
(45) Date of Patent: Apr. 1, 2003

(54) DISTANCE MEASURING AND MONITORING DEVICE EQUIPPED AUTOMOBILE REVERSE RADAR

(75) Inventor: Wu-Chung Yang, Kaohsiung (TW)

(73) Assignee: Whetron Industrial Co., Ltd., Kaohsiung (TW)

( * ) Notice: Subject to any disclaimer, the term of this patent is extended or adjusted under 35 U.S.C. 154(b) by 0 days.

(21) Appl. No.: 09/969,592

(22) Filed: Oct. 4, 2001

(51) Int. Cl.⁷ .................................................. G08G 1/16
(52) U.S. Cl. ..................... 340/903; 340/435; 340/937; 701/301; 367/99; 367/108
(58) Field of Search ................. 340/435, 436, 340/937, 903, 904; 701/301; 367/99, 108

(56) References Cited

U.S. PATENT DOCUMENTS

| | | | | |
|---|---|---|---|---|
| 5,027,200 A | * | 6/1991 | Petrossian et al. | 358/103 |
| 5,289,321 A | * | 2/1994 | Secor | 359/896 |
| 5,574,426 A | * | 11/1996 | Shisgal et al. | 340/435 |
| 5,574,443 A | * | 11/1996 | Hsieh | 340/435 |
| 6,259,359 B1 | * | 7/2001 | Fujinami et al. | 340/435 |
| 6,326,915 B1 | * | 12/2001 | Chen et al. | 342/71 |
| 6,360,170 B1 | * | 3/2002 | Ishikawa et al. | 340/903 |

\* cited by examiner

Primary Examiner—Daniel J. Wu
(74) Attorney, Agent, or Firm—Rosenberg, Klein & Lee

(57) ABSTRACT

A distance measuring and monitoring device equipped automobile reverse radar comprises: a photocoupler camera with a wide-angle lens installed at an automobile rear end for taking pictures of possible obstacles behind the automobile body; a distance measuring inductor for calculation of lateral distance between two lateral corners of the automobile body and an obstacle; and a power supply for supplying power to the photocoupler camera, the distance measuring inductor, and the display. The image of the obstacle is mirror-image processed, then forwarded to an image synthesizer for image synthesization, and transferred to a video processor and shown in a display. A reverse gear signal is the effective signal for triggering the power supply.

5 Claims, 4 Drawing Sheets

DISTANCE MEASURING AND MONITORING DEVICE EQUIPPED AUTOMOBILE REVERSE RADAR

FIELD OF THE INVENTION

This invention relates generally to an automobile reverse radar, in particular, it relates to a distance measuring and monitoring device equipped automobile reverse radar, which is provided to measure the distance between an automobile body and an obstacle by an ultrasonic measuring method and show them on a display to facilitate a safe reversing.

BACKGROUND OF THE INVENTION

In driving reversely, through back mirrors, a driver is still inevitably blinded in some dead angles that may occasionally incur bumps or scrapes. Therefore, to drive in reverse for roadside parking is considered a neither-too-big-nor-too-small challenge to a veteran during rush hours, and it is particularly a big trouble to a green-hand.

For improvement, a local U.S. Pat. No. 297,374 (abbreviated as "the cited" hereinafter) has disclosed that three monitors are mounted on a car's lateral sides and rear side respectively to eliminate any possible dead angle when reversing by selecting different pictures in the monitors. However, the cited would distract a driver by putting him busy in switching the monitors back and forth, which doesn't help in reality but worsen the situation according to the general opinion.

In view of abovesaid imperfection, after years of constant efforts in research, the inventor of this invention has consequently developed an improved mechanism to be described below pertaining to the subject matter.

SUMMARY OF THE INVENTION

The primary object of this invention is to provide a distance measuring and monitoring device equipped automobile reverse radar that unites the video synthesis technology and a distance measuring inductor to enable a driver to see clearly the circumstance behind an automobile body and thereby eliminate any dead angle when viewing through the back mirrors on the one hand and to see a digitized distance in a display to ensure a safe reversing.

Another object of this invention is to provide a distance measuring and monitoring device equipped automobile reverse radar, which can express the distance between an obstacle and an automobile body in sound as an auxiliary measure.

Yet another object of this invention is to provide a distance measuring and monitoring device equipped automobile reverse radar, which can express non-inverse pictures of an obstacle in a display without mizzling a driver.

In order to realize abovesaid objects, the distance measuring and monitoring device equipped automobile reverse radar of this invention comprises: a photocoupler camera with a wide-angle lens installed at an automobile rear end for taking pictures of possible obstacles behind the automobile body; a distance measuring inductor for calculation of the lateral distance between two lateral corners of the automobile body and an obstacle; and a power supply for supplying power to the photocoupler camera, the distance measuring inductor, and the display. The image of an obstacle is mirror-image processed, then forwarded to an image synthesizer for image synthesization, and transferred to a video processor and shown in the display. A reverse gear signal is the effective signal for triggering the power supply.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE PREFERRED EMBODIMENT

Figure 1:
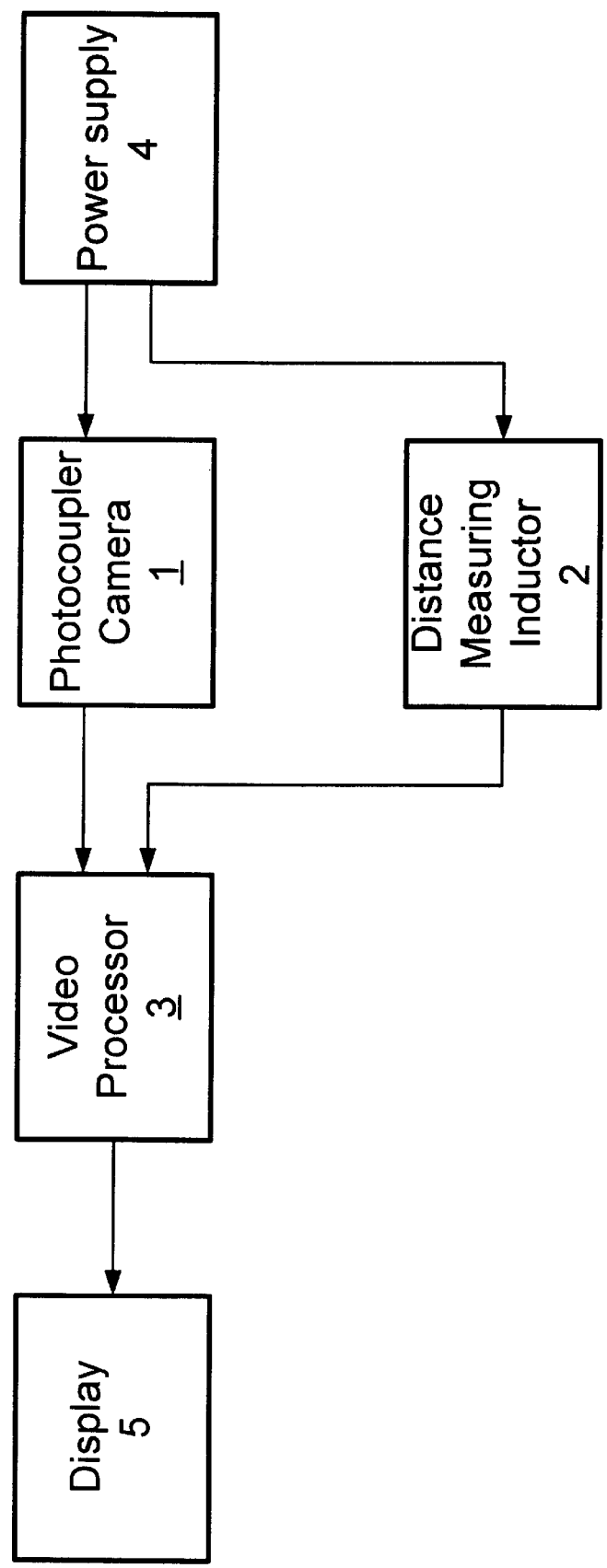
FIG. 1 is the system block diagram of a distance measuring and monitoring device equipped automobile reverse radar of this invention.

A distance measuring and monitoring device equipped automobile reverse radar of this invention shown in FIG. 1 mainly comprises a photocoupler camera 1, a distance measuring inductor 2, a video processor 3, and a power supply 4.

The photocoupler camera 1 is provided for taking pictures of possible obstacles behind a car's rear bumper and transmitting the pictures to be shown in a display settled adjacent to the dashboard.

The distance measuring inductor 2 is mounted on a car's rear end adjacent to the rear bumper at two lateral positions respectively for measuring distance between a possible obstacle and both lateral ends of a car basing on the ultrasonic principle. The measured results together with the taken video signals are shown in a display 5 to keep the driver informed of the peripheral situation.

The video processor 3 is implemented for mirror-image processing the photographed pictures and the measured results, and transmitting them to a video synthesizer, which then forwards the synthesized pictures to the display 5.

The power supply 4 is actuated by a gear signal to provide power to the photocoupler camera 1, the distance measuring inductor 2, and the display 5.

Figure 2:
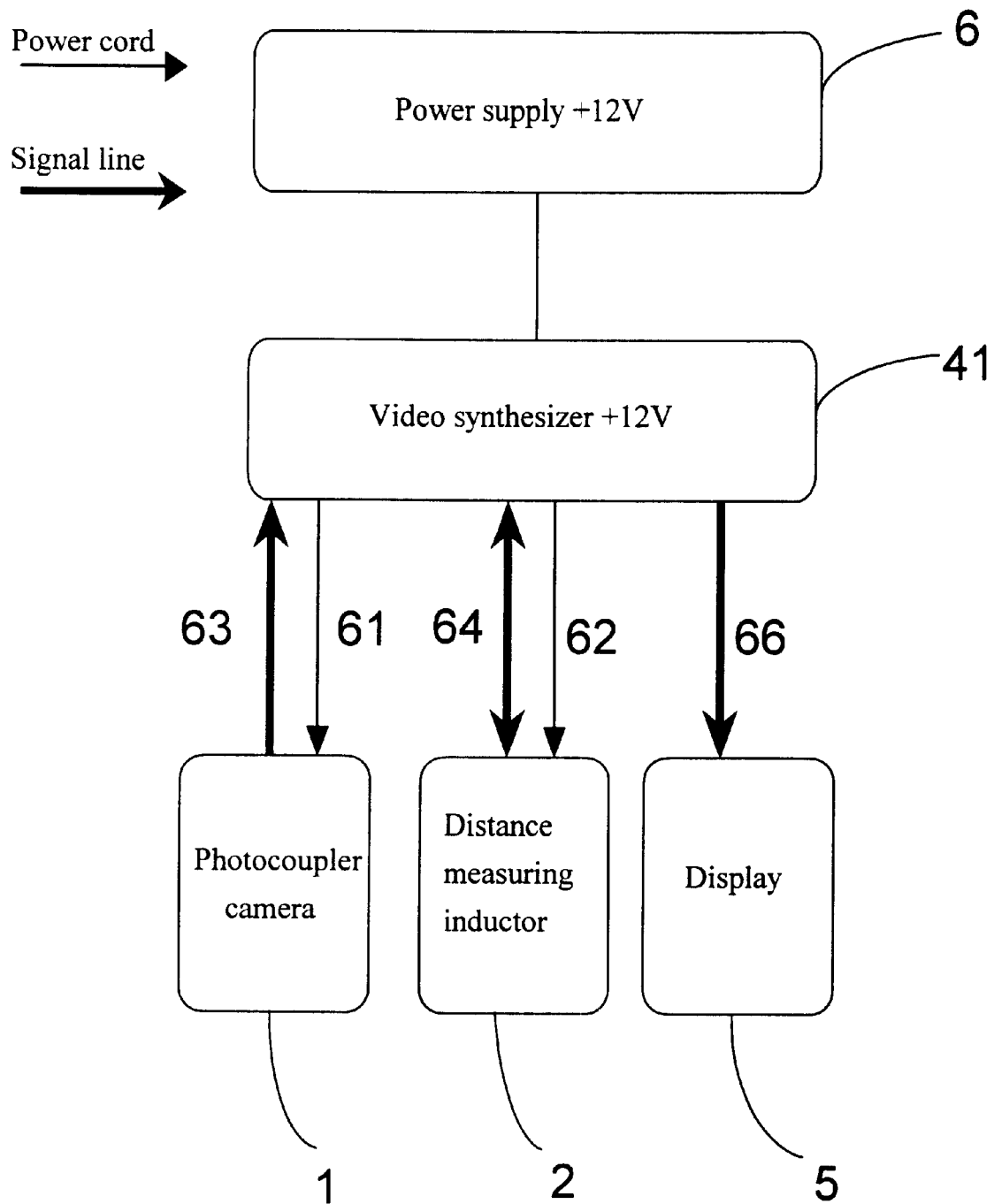
FIG. 2 is the block diagram of a power supply of the distance measuring and monitoring device equipped automobile reverse radar of this invention.

Referring to FIG. 2—a block diagram of power supply of this invention—when power is effected by a gear signal, power 41 is provided to a video synthesizer 6, then to the photocoupler camera 1 and the distance measuring inductor 2 through respective power cords 61, 62. After the photocoupler camera 1 and the distance measuring inductor 2 have been actuated, the measured data and the taken pictures will be transmitted to the video synthesizer 6 through a signal line 63, 64, then the synthesized data is forwarded to the display 5 through a signal line 66.

That is, a driver is supposed to shift the gear to the reverse, the power supply 4 is effected, meanwhile the display 5 shows the mirror-image processed obstacles and the data expressing the distance between the automobile body and the obstacles measured by an ultrasonic method.

Figure 3:
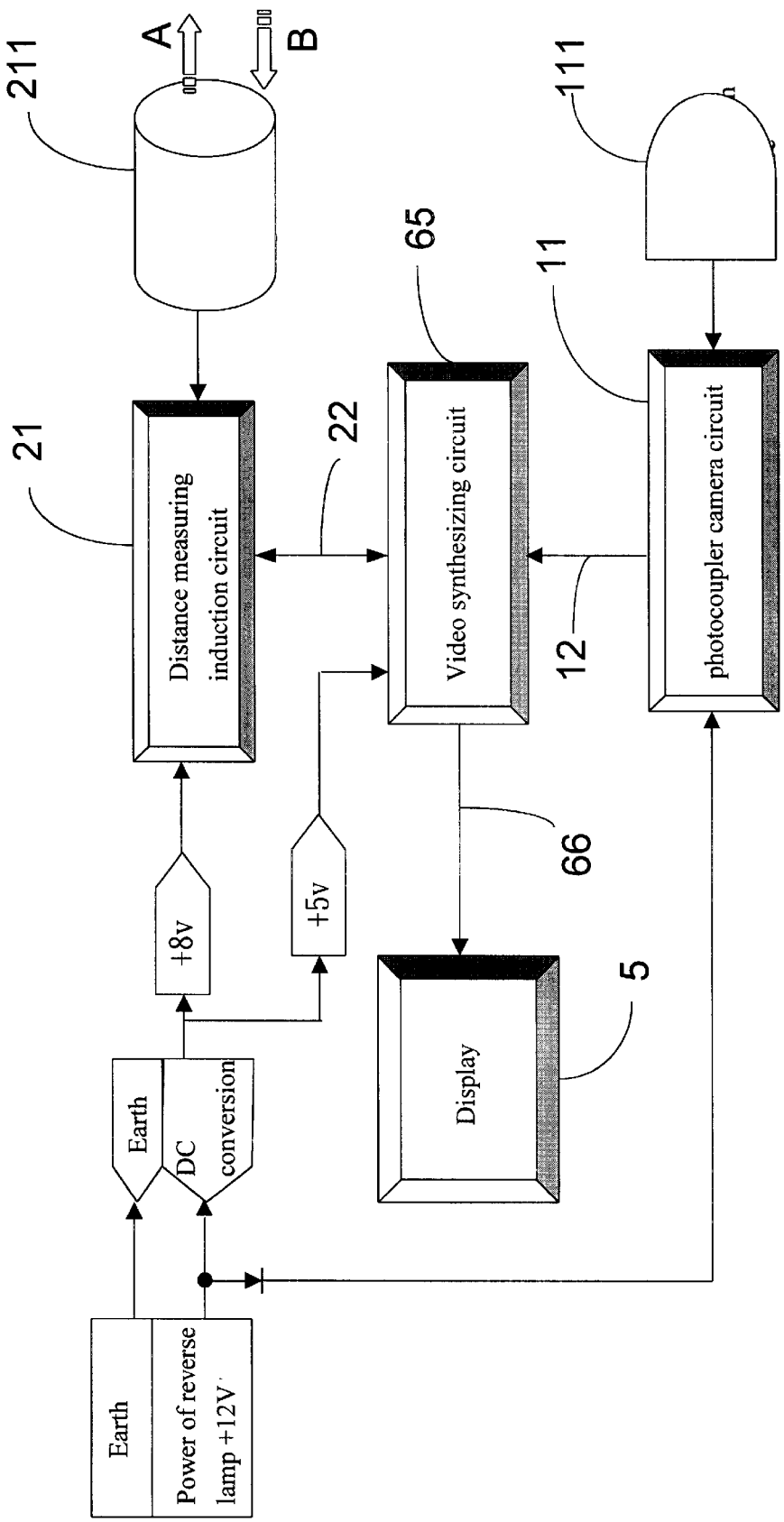
FIG. 3 is the circuitry block diagram of a video processor of the distance measuring and monitoring device equipped automobile reverse radar of this invention.

As shown in FIG. 3—a circuitry block diagram of video processor of this invention-the video processor includes three portions, namely: a distance measuring induction circuit 21, a video synthesizing circuit 65, and a photocoupler camera circuit 11. When power is supplied, the distance measuring induction circuit 21, the video synthesizing circuit 65, and the photocoupler camera circuit 11 would start detection, wherein the distance measuring induction circuit 21 urges an inductor to produce a train of waves at 40 KHz by taking advantage of an oscillation circuit to further drive an ultrasonic wave inductor 211 to transmit an ultrasonic signal (A) which is supposed to reflect as an ultrasonic signal (B) toward the inductor 211 when hitting upon an obstacle. At this moment, the inductor 211 starts to calculate for the distance between the automobile body and an obstacle by multiplying the transmission speed of ultrasonic wave in air by the time elapsed since being transmitted. Meanwhile, a photograph device 111 of the photocoupler camera circuit 11 has obtained a synchronous video signal too, so that the respective signals of the distance measuring induction circuit 21 and the photocoupler camera circuit 11 are forwarded through signal lines 12, 22 to the video synthesizing circuit 65 simultaneously for synthesization, then transferred through the signal line 66 to the display 5.

Figure 4:
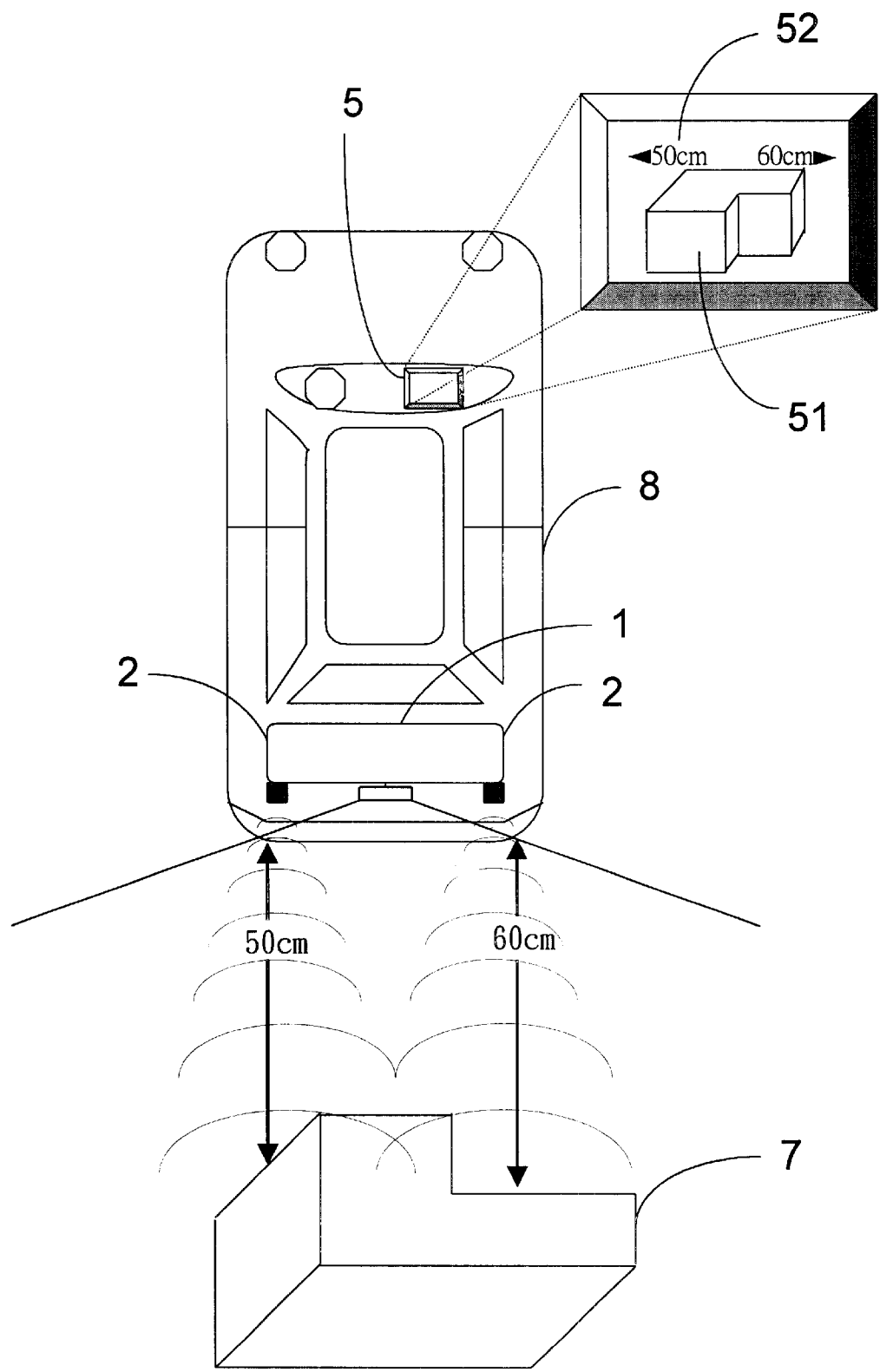
FIG. 4 shows a distance measuring inductor of the distance measuring and monitoring device equipped automobile reverse radar of this invention.

Referring to FIG. 4—a schematic view of distance measuring inductor of this invention—an oscillation circuit is provided to drive an ultrasonic wave inductor to produce ultrasonic waves at 40 KHz, and when the emitted ultrasonic waves hit upon an obstacle, the ultrasonic waves will be reflected to the inductor, which would start to calculate for the distance between the automobile body and an obstacle by multiplying the transmission speed of ultrasonic wave in air by the time elapsed since being transmitted. The distance measuring inductor 2 is bisected and separately installed at proper positions on back of the automobile body 8. When an obstacle 7 is located at a position out of a predetermined alert range, the display 5 shows the image of the obstacle 51 and the distance in digits 52, which is variable from time to time according to change of the distance. If the obstacle 7 at this time is located within said alert range, the display 5 would trigger a buzzer (not shown) to warn the driver in addition to display of image and distance, and the buzz would become hasty accompanied with a warning phrase as the distance is shortened to locate in the scope of a "Stop range". Moreover, the photocoupler camera 1 of this invention is equipped with a 150° super wide-angle lens to cover almost the entire visual field behind the automobile body.

FIG. 4 also shows that the photocoupler camera 1 is separately disposed at an automobile's rear end for taking pictures of an obstacle 7 and the distance measuring inductor 2 is separately arranged on two sides of the automobile body 8 respectively.

Suppose now the obstacle 7 is irregularly shaped and the distance at the left and the right side between the obstacle 7 and the automobile body 8 are, for example, 50 cm and 60 cm respectively. The photocoupler camera 1 will take the pictures of the obstacle 7 and have them processed and shown in the display 5 in non-inverse postures without mizzling a driver.

The distance measuring and monitoring device equipped automobile reverse radar is merited as the following when compared with the cited patent or other prior arts:

1. This invention can digitize the distance between an obstacle and the automobile body and show it specifically in a display instead of a mere picture.

2. This invention is capable of providing a wider visual field so as to avoid any accident when reversing.

3. To lessen bumping accident or traffic conflict is possible.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A distance measuring and monitoring device equipped automobile reverse radar, comprising:

a photocoupler camera disposed at an automobile's rear end for taking pictures behind the automobile with a wide-angle lens;

an ultrasonic distance measuring inductor disposed at the rear end of the automobile's bumper between two lateral corners of the automobile body for calculation of the lateral distance between an obstacle and the lateral corners of the automobile body;

a video processor for processing pictures taken by the photocoupler camera, forwarding the processed pictures to a video synthesizer for synthesization with said lateral distance calculated by said distance measuring inductor;

a display disposed inside the automobile for showing the taken pictures and the distance from the obstacle to the lateral corners of the automobile body; and a power supply connected to said video synthesizer, photocoupler camera, distance measuring inductor and display, and triggered by a gear signal indicative of the reverse state of the gear for providing power to said video synthesizer, photocoupler camera, distance measuring inductor, and display;

wherein the detected distance between the obstacle and the automobile body is processed and shown in digits on said display.

2. The automobile reverse radar according to claim 1, wherein the photocoupler camera and the distance measuring inductor are actuated to transmit the pictures taken and the distance data measured to the video synthesizer for synthesization thereof, the synthesized data being further forwarded to the display, and wherein the processed pictures of the photocoupler camera are displayed in non-inverse fashion with respect to the obstacle.

3. The automobile reverse radar according to claim 1, wherein the distance measuring inductor generates a train of ultrasonic waves at 40 KHz by means of an oscillation circuit, said distance measuring inductor calculating the distance by multiplying the time elapsed between transmitting and receiving ultrasonic waves and the speed of the ultrasonic waves.

4. The automobile reverse radar according to claim 1, wherein the photocoupler camera is a wide-angle lens equipped camera.

5. The automobile reverse radar according to claim 1, wherein the distance measuring inductor provides pictures and distance digits depending on variation of the distance.

* * * * *